US011419077B2

(12) United States Patent
Tang et al.

(10) Patent No.: US 11,419,077 B2
(45) Date of Patent: Aug. 16, 2022

(54) METHOD AND APPARATUS FOR SYNCHRONIZATION TO A COMMON SYNCHRONIZATION REFERENCE SOURCE

(71) Applicant: MEDIATEK SINGAPORE PTE. LTD., Solaris (SG)

(72) Inventors: Zhixun Tang, Beijing (CN); Tao Chen, Beijing (CN); Min Lei, Beijing (CN)

(73) Assignee: MEDIATEK SINGAPORE PTE. LTD., Solaris (SG)

( * ) Notice: Subject to any disclaimer, the term of this patent is extended or adjusted under 35 U.S.C. 154(b) by 54 days.

(21) Appl. No.: 16/993,681

(22) Filed: Aug. 14, 2020

(65) Prior Publication Data

US 2021/0051613 A1    Feb. 18, 2021

Related U.S. Application Data

(63) Continuation of application No. PCT/CN2019/101044, filed on Aug. 16, 2019.

(30) Foreign Application Priority Data

Jul. 8, 2020 (CN) .......................... 202010650110.8

(51) Int. Cl.
*H04W 56/00* (2009.01)
*H04W 72/10* (2009.01)
*H04W 72/04* (2009.01)
*H04W 4/40* (2018.01)
*H04L 45/12* (2022.01)

(52) U.S. Cl.
CPC ......... *H04W 56/001* (2013.01); *H04L 45/123* (2013.01); *H04W 4/40* (2018.02); *H04W 72/0446* (2013.01); *H04W 72/10* (2013.01); *H04M 2250/10* (2013.01); *H04N 2201/3253* (2013.01)

(58) Field of Classification Search
CPC ........................ H04W 56/001; H04W 76/046; H04L 45/123; H04M 2250/10; H04N 2201/3253
See application file for complete search history.

(56) References Cited

U.S. PATENT DOCUMENTS

| 2018/0098323 | A1* | 4/2018 | Zhang | .................... H04W 72/10 |
| 2019/0037622 | A1* | 1/2019 | Blasco Serrano | .... H04W 76/14 |
| 2020/0084642 | A1* | 3/2020 | Siomina | ................ H04W 24/02 |
| 2020/0107284 | A1* | 4/2020 | Nguyen | ............. H04W 52/383 |
| 2021/0185628 | A1* | 6/2021 | Huang | ............. H04W 56/0015 |

\* cited by examiner

*Primary Examiner* — Salvador E Rivas
(74) *Attorney, Agent, or Firm* — Oblon, McClelland, Maier & Neustadt, L.L.P.

(57) ABSTRACT

Aspects of the disclosure provide a method and an apparatus for synchronization to a common synchronization reference source. For example, the apparatus can include receiving circuitry and processing circuitry. The receiving circuitry can be configured to receive from a BS a signaling indicating a timing offset between sidelink synchronization timings of the apparatus and a GNSS. The processing circuitry can be configured to adjust the sidelink synchronization timing of the apparatus based on the timing offset.

16 Claims, 5 Drawing Sheets

METHOD AND APPARATUS FOR SYNCHRONIZATION TO A COMMON SYNCHRONIZATION REFERENCE SOURCE

INCORPORATION BY REFERENCE

This present disclosure claims the priority of PCT/CN2019/101044, titled "SYNCHRONIZATION PROCEDURE DESIGN FOR V2X COMMUNICATION" filed on Aug. 16, 2019, and Chinese Patent Application No. 202010650110.8 filed on Jul. 8, 2020 which are incorporated herein by reference in their entirety.

TECHNICAL FIELD

The present disclosure relates to wireless communications, and, more particularly, to a method and an apparatus for synchronization to a common synchronization reference source.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Support for direct device-to-device (D2D) connectivity between two user equipment (UEs) without signal relay through a base station (BS) was first introduced in Release 12 of the Third Generation Partnership Project (3GPP) Long-Term Evolution (LTE) specifications for public safety. Sidelink transmissions in Release 13 support UE-to-Network relay, in which an in-coverage UE is able to relay signals between an eNB and an out-of-coverage UE. In Release 14, the scenario of sidelink transmissions is extended from D2D proximity service (ProSe) solely for public safety to vehicle-to-everything (V2X). As the evolution of Release 14 continues, 3GPP in Release 15 adopted new functions such as carrier aggregation (CA) and transmission diversity. 3GPP New Radio (NR) in Release 16 continues the evolution of sidelink transmissions, and supports a number of new sidelink functions not provided in the LTE and LTE-Advanced (LTE-A), including the feedback channel, grant-free access, enhanced channel sensing procedure, and new control channel design.

When the UEs are vehicles, the D2D communication may be referred to as vehicle-to-vehicle (V2V) communication. Other vehicle-based UE communications may include vehicle-to-everything (V2X), vehicle-to-infrastructure (V2I), vehicle-to-pedestrian (V2P), and vehicle-to-network (V2N).

SUMMARY

Aspects of the disclosure provide a method for synchronization to a common synchronization reference source. The method can include receiving a signaling from a base station (BS) at a user equipment (UE). The signaling can indicate a timing offset between sidelink synchronization timings of the UE and a global navigation satellite system (GNSS). The method can further include adjusting the sidelink synchronization timing of the UE based on the timing offset. The method can also include prioritizing a sidelink transmission associated with the adjusted sidelink synchronization timing over an uplink transmission colliding with the sidelink transmission when the sidelink transmission has a higher priority than the uplink transmission, and prioritizing the uplink transmission over the sidelink transmission when the sidelink transmission does not have a higher priority than the uplink transmission.

For example, the signaling can be a radio resource control (RRC) signaling, a media access control-control element (MAC-CE), or downlink control information (DCI). The BS can act as a synchronization reference source for the UE. In some embodiments, the UE can be out-of-coverage on a sidelink carrier, and in-coverage of a serving cell associated with the BS on a non-sidelink carrier. In some other embodiments, the UE can be in-coverage with a serving cell associated with the BS on a sidelink carrier at which the UE has capability to operate. In an embodiment, the timing offset can include at least one slot-level offset. For example, the timing offset can include at least one slot and at least one symbol. In another embodiment, the timing offset can be indicated by a bitmap. For example, the bitmap can include two bits.

Aspects of the disclosure further provide an apparatus for synchronization to a common synchronization reference source. The apparatus can include receiving circuitry and processing circuitry. The receiving circuitry can be configured to receive from a BS a signaling indicating a timing offset between sidelink synchronization timings of the apparatus and a GNSS. The processing circuitry can be configured to adjust the sidelink synchronization timing of the apparatus based on the timing offset.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

User equipment (UEs) cannot communicate with one another over sidelinks when they are not synchronized. According to some embodiments of the disclosure, the UEs can receive from a base station (BS) a signaling indicating a timing offset between sidelink synchronization timings of the UEs and a global navigation satellite system (GNSS). The UEs can then adjust their sidelink synchronization timings based on the timing offset. Therefore, the UEs can communicate with one another over sidelinks as they are all synchronized to the GNSS.

Figure 1:
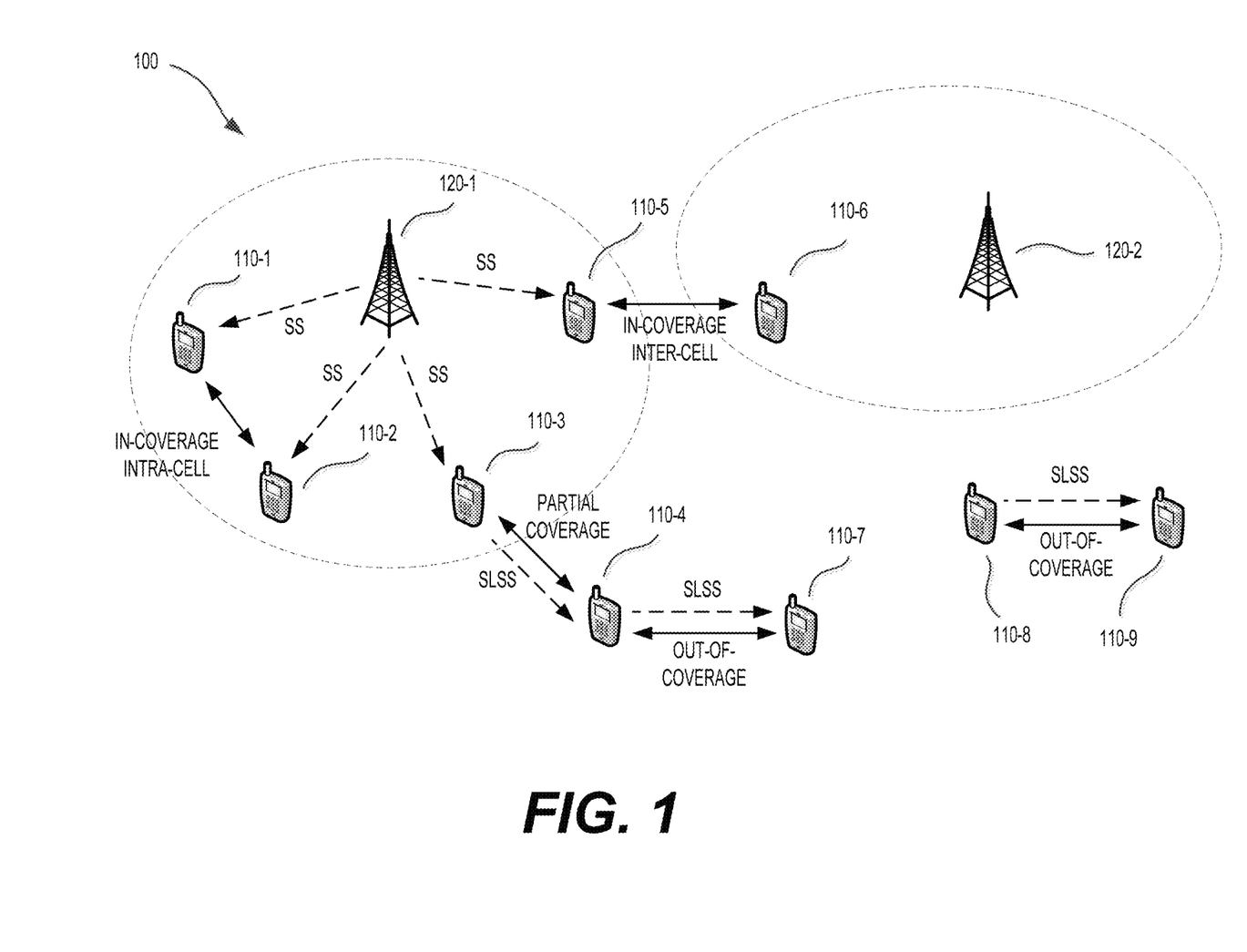
FIG. 1 shows an exemplary wireless communication system according to some embodiments of the disclosure.

FIG. 1 shows an exemplary wireless communication system 100 according to some embodiments of the disclosure. The wireless communication system 100 can include BSs 120-1 and 120-2 and UEs 110-1 to 110-9. The BSs 120 can include eNBs and/or gNBs. For example, the BS 120-1 is an eNB and the BS 120-2 is a gNB; the BS 120-1 is a gNB and the BS 120-2 is an eNB; both the BSs 120-1 and 120-2 are an eNB; or both the BSs 120-1 and 120-2 are a gNB. The UEs 110 can be a vehicle, a computer, a mobile phone, and the like. The UEs 110 can communicate with the BSs 120 (e.g., the UEs 110-1 to 110-3 can communicate with the BS 120-1, and the UE 110-6 can communicate with the BS 120-2), and can involve in direct sidelink connectivity with one another (e.g., the UEs 110-5 and 110-6 can involve in direct sidelink connectivity). The BSs 120 may be or may be not synchronized.

UEs involved in sidelink connectivity may be under network coverage (i.e., "in-coverage"). For example, the UEs 110-1, 110-2 and 110-5 are in-coverage of the BS 120-1, and the UE 110-6 is in-coverage of the BS 120-2. Sidelink connectivity is also possible for UEs outside of network coverage (i.e., "out-of-coverage"). For example, the out-of-coverage UEs 110-4 and 110-7 and UEs 110-8 and 110-9 can establish their respective sidelink connectivity, respectively. Sidelink connectivity can also be established when some UEs involved in sidelink connectivity are in-coverage and some other UEs are out-of-coverage (i.e., "partial coverage"). For example, the in-coverage UE 110-3 can establish sidelink connectivity with the out-of-coverage UE 110-4. For the in-coverage scenario, the UEs receiving a sidelink transmission and the transmitting UE may be within the same cell ("intra-cell") or in different cells ("inter-cell"). For example, the in-coverage UEs 110-1 and 110-2 are within the same cell, while the in-coverage UEs 110-5 and 110-6 are within different cells associated with the BSs 120-1 and 120-2, respectively. For in-coverage UEs, sidelink connectivity can take place in a radio resource control (RRC)_connected state. However, sidelink connectivity can also take place in an RRC_idle state.

Before establishing sidelink connectivity, the UEs 110-1 to 110-9 should be well synchronized to one another, or to the overlaid network if present. A UE that is in-coverage or out-of-coverage will have different mechanisms of acquiring transmission timings and configuration parameters are needed for proper sidelink connectivity. In-coverage UEs can use a synchronization signal (SS), including a primary synchronization signal (PSS) and a secondary synchronization signal (SSS), of a serving cell when they are in the RRC_CONNECTED state or a cell they are camping on when they are in the RRC_IDLE state as a timing reference for their sidelink transmissions. For example, the UEs 110-1 to 110-3 and 110-5 can receive the SS from the BS 120-1 and be synchronized to the BS 120-1. The BS 120-1 may be referred to as a synchronization reference source for the UEs 110-1 to 110-3 and 110-5. Out-of-coverage UEs can acquire their transmission timing from a sidelink SS (SLSS), including a sidelink primary synchronization signal (S-PSS) and a sidelink secondary synchronization signal (S-SSS), transmitted by other UEs, which are referred to as synchronization reference UEs (SyncRef UEs). Different from the PSS and SSS, each of which occupies only one symbol in time, the S-PSS and the S-SSS each occupies two consecutive symbols, as the sidelink channel conditions may be more severe than the channel conditions in conventional mobile communication systems. For example, the multipath fading and the fast fading due to the Doppler effect may be more pronounced in sidelink communication channels.

SyncRef UEs can be in-coverage. In general, in-coverage SyncRef UEs can have their transmission timings derived directly from the network. UEs, though being in-coverage of a serving cell, may have their sidelink transmission timings derived from other synchronization reference sources. For example, the UEs may be in-coverage of a serving cell but with poor synchronization signal strength, and can have their sidelink transmission timings derived from the V2X carrier.

SyncRef UEs can also be out-of-coverage. The out-of-coverage SyncRef UEs can have their transmitting timing derived from SLSS transmitted either from other UEs or been selected autonomously. An out-of-coverage UE should select a SyncRef UE based on the following order: first searching for SLSS transmitted from an in-coverage UE; if no such SLSS can be found, then searching for SLSS transmitted from an out-of-coverage UE that has an in-coverage UE as its SyncRef UE; if no such SLSS can be found, then searching for any SLSS; if no such SLSS can be found, then autonomously selecting its transmission timing, that is, without a SyncRef UE. For example, the out-of-coverage UE 110-4 can acquire its transmission timing from SLSS transmitted by the in-coverage SyncRef UE 110-3, and the UE 110-3 can receive SS transmitted from the BS 120-1 and have its transmitting timing derived directly from the BS 120-1. In another example, the out-of-coverage UE 110-7 can acquire its transmission timing from SLSS transmitted by the out-of-coverage SyncRef UE 110-4, and the UE 110-4 can receive the SLSS transmitted from the in-coverage SyncRef UE 110-3. In yet another example, the out-of-coverage UE 110-9 can select the out-of-coverage UE 110-8 autonomously as its SyncRef UE and be synchronized to the UE 110-8.

V2X sidelink communications can also use a Global Navigation Satellite System (GNSS) time to derive a reference timing when in-coverage or out-of-coverage. When GNSS time is used as the synchronization reference source, a UE can use Coordinated Universal Time (UTC) to calculate Direct Frame Number (DFN) and subframe number. For example, when a UE is powered on, it can search for the GNSS signal; if the GNSS signal can be found and received, the UE can be synchronized to the GNSS and become a synchronization reference source for other UEs; if the GNSS signal is not available, then it can search for and synchronize to SLSS transmitted from a UE directly synchronized to the GNSS; if such UE cannot be found, it can search for a UE indirectly synchronized to the GNSS, i.e., a UE synchronized to another UE that is directly synchronized to the GNSS. The GNSS time may be or may be not aligned with the timings of the BSs 120.

Figure 2:
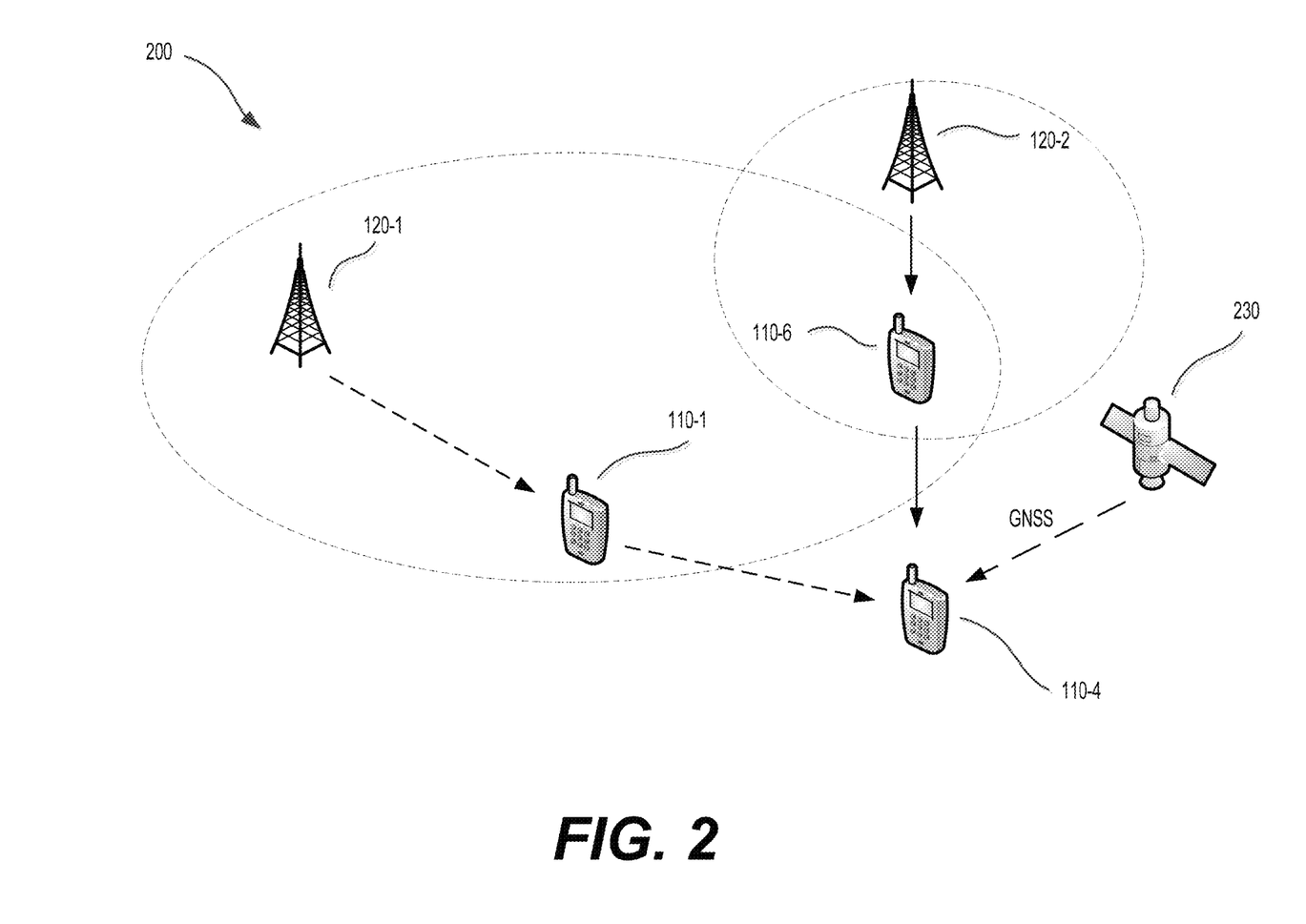
FIG. 2 shows another exemplary wireless communication system according to some embodiments of the disclosure.

FIG. 2 shows an exemplary wireless communication system 200 according to some embodiments of the disclosure. The wireless communication system 200 can include the BSs 120-1 and 120-2, the UEs 110-1, 110-4 and 110-6, and a GNSS 230. For example, the GNSS 230 can be obtained by Global Positioning System (GPS), Beidou Navigation, Galileo Satellite Navigation System etc. In the example shown in FIG. 2, the cells associated with the BSs 120-1 and 120-2 are overlapped. In some other embodiments, the cells can be separated from each other, or one of them can be completely within the other. In the example shown in FIG. 2, the BS 120-1 is an eNB, and the BS 120-2 is a gNB. In some other embodiments, the BSs 120-1 and 120-2 can be a gNB and an eNB, respectively, or both can be an eNB or a gNB. The UEs 110-1, 110-6 and 110-4 are synchronized to the BS 120-1, the BS 120-2 and the GNSS 230, respectively.

Figure 3:
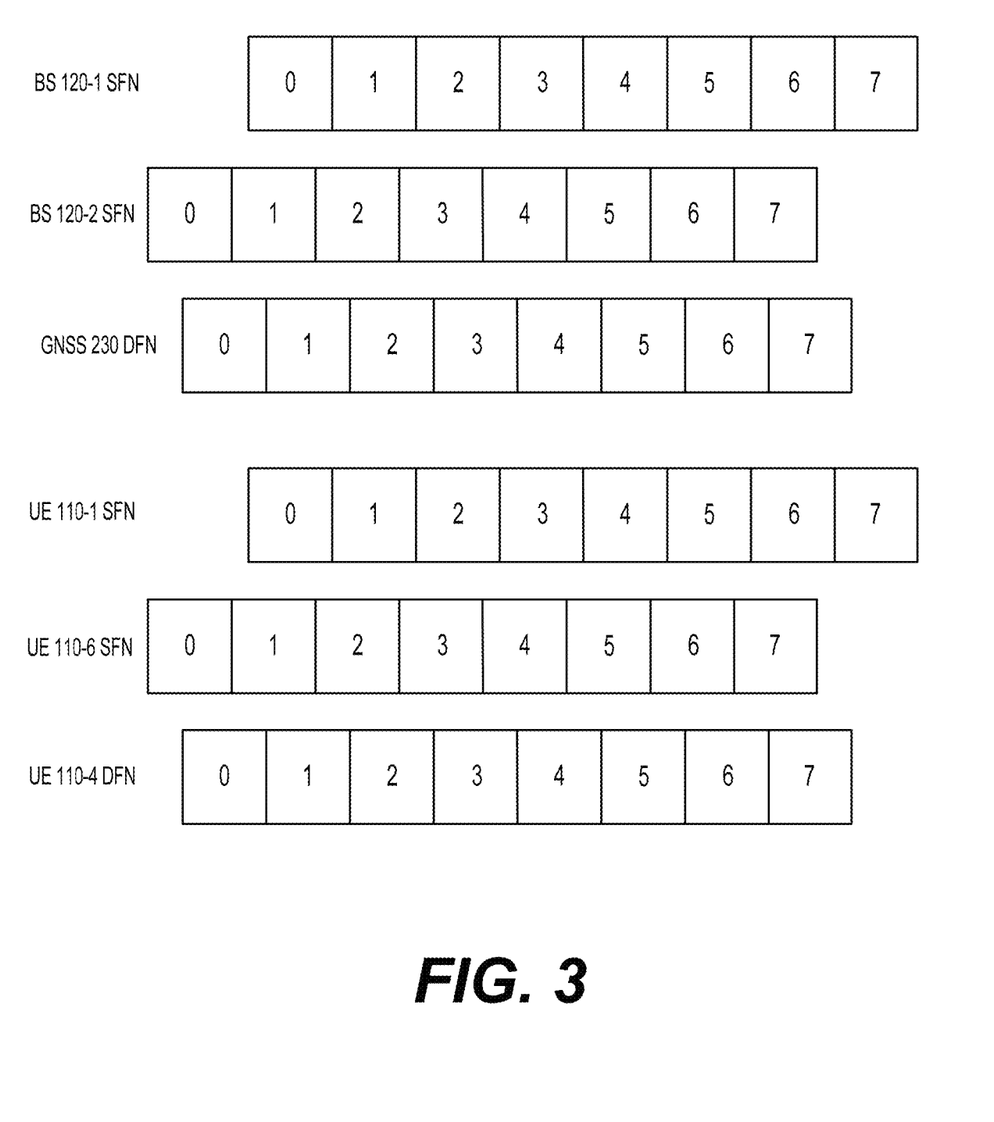
FIG. 3 shows exemplary system frame numbers (SFNs) associated base stations (BSs) and corresponding user equipments (UEs) and direct frame numbers (DFNs) associated with a global navigation satellite system (GNSS) and a corresponding UE shown in FIG. 2 according to some embodiments of the disclosure.

FIG. 3 shows exemplary system frame numbers (SFNs) associated with the BSs 120-1 and 120-2 and the UEs 110-1 and 110-6 and DFNs associated with the GNSS 230 and the UE 110-4 according to some embodiments of the disclosure. In the example shown in FIG. 3, the BS 120-1 is not synchronized to the BS 120-2, and the BSs 120-1 and 120-2 each is not synchronized to the GNSS 230. Therefore, the SFNs of the UEs 110-1 and 110-6, which have the BSs 120-1 and 120-2 as their synchronization reference sources, respectively, and the DFN of the UE 110-4, which has the GNSS 230 as its synchronization reference source, are not aligned with one another. For example, a timing offset can be between the sidelink synchronization timings of the UE 110-1 and the GNSS 230. In some embodiments, the BSs 120-1 and 120-2 may be synchronized to each other, and be not synchronized to GNSS 230.

In some embodiments, the UEs 110-1 and 110-6 can be in-coverage with a serving cell on a sidelink carrier. Therefore, several possible scenarios may exist: (1) the UE 110-1 may be synchronized to the BS 110-1, and the UE 110-6 may be synchronized to the GNSS 230; (2) both the UEs 110-1 and 110-6 may be synchronized to the GNSS 230; (3) the UEs 110-1 and 110-6 may be synchronized to the BSs 120-1 and 120-2, respectively, and the BSs 120-1 and 120-2 may be synchronized to each other; and (4) the UEs 110-1 and 110-6 may be synchronized to the BSs 120-1 and 120-2, respectively, and the BSs 120-1 and 120-2 may not be synchronized to each other. In scenarios (1) and (2), the UE 110-1 can be configured a symbol-level timing offset to avoid the collision between its sidelink transmission and uplink transmission. For example, the UE 110-1 can adjust its sidelink synchronization timing to be a configured number of symbols earlier or later. In scenario (3), the UEs 110-1 and 110-6 can communicate with each other as the BSs 120-1 and 120-2 to which they are synchronized are synchronized to each other. In scenario (4), the UE 110-1's (and the UE 110-6 as well) sidelink and uplink will collide, and the UEs 110-1 and 110-6 cannot communicate with each other as their sidelink transmissions are not synchronized.

In some other embodiments, the UEs 110-1 and 110-6 can be out-of-coverage on a sidelink carrier (or V2X carrier) and in-coverage with a serving cell on a non-V2X sidelink carrier. Therefore, several possible scenarios may exist: (1) the UE 110-1 may be synchronized to the BS 120-1, and the UE 110-6 may be synchronized to the GNSS 230; (2) the UEs 110-1 and 110-6 may be synchronized to the GNSS 230; (3) the UE 110-1 may be synchronized to the GNSS 230, and the UE 110-6 may be synchronized to the BS 120-2; and (4) the UE 110-1 may be synchronized to the BS 120-1, and the UE 110-6 may be synchronized to the BS 120-2. In scenarios (1) and (3), the UEs 110-1 and 110-6 can be configured a symbol-level timing offset in order for them to communicate with each other. In scenario (2), the UEs 110-1 and 110-6 can communicate with each other as they both are synchronized to the GNSS. In scenario (4), the UEs 110-1 and 110-6 are synchronized to the BSs 120-1 and 120-2, respectively, and the timing difference between the BSs 120-1 and 120-2 (if they are eNB and gNB, respectively) can be up to 500 μs, which may include a slot-level timing difference and a symbol-level timing difference.

Figure 4:
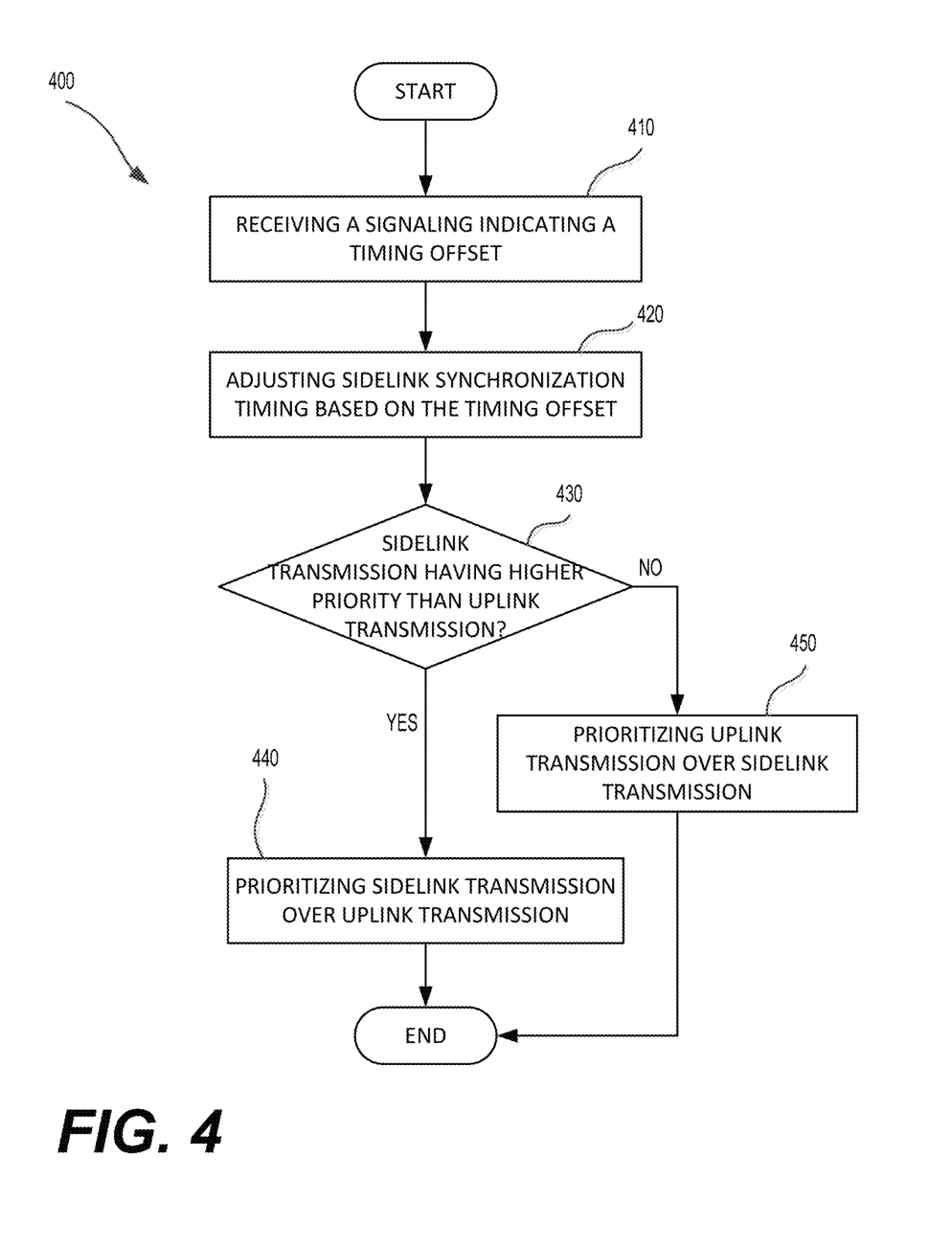
FIG. 4 shows an exemplary method for synchronization to a common synchronization reference source according to some embodiments of the disclosure.

FIG. 4 shows an exemplary method 400 for synchronization to a common synchronization reference source according to some embodiments of the disclosure. The method 400 can allow sidelink UEs that are not synchronized (e.g., as in the above two scenarios (4)) to communicate with each other. In various embodiments, some of the steps of the method 400 shown can be performed concurrently or in a different order than shown, can be substituted by other method steps, or can be omitted. Additional method steps can also be performed as desired. Aspects of the method 400 can be implemented by a wireless device, such as the UEs 110-1 and 110-6 illustrated in and described with respect to the preceding figures.

At step 410, the UE 110-1/UE 110-6 can receive a signaling from the BS 120-1/BS 120-2 indicating a timing offset between sidelink synchronization timings of the UE 110-1/UE 110-6 and the GNSS 230. For example, the signaling can be an RRC signaling, a media access control-control element (MAC-CE), or downlink control information (DCI). In an embodiment, the timing offset can be indicated by a bitmap. For example, the bitmap can include two bits, such as "00" indicating that the UE 110-1/UE 110-6 is one slot falling behind the GNSS 230, "01" indicating that the UE 110-1/UE 110-6 and the GNSS 230 are at the same slot, and "10" indicating that UE 110-1/UE 110-6 is one slot leading the GNSS 230. The BS 102-1/120-2 can be a synchronization reference source for the UE 110-1/UE 110-6. In some embodiments, the UE 110-1/UE 110-6 can be out-of-coverage on a sidelink carrier, such as a V2X carrier, and be in-coverage of a serving cell associated with the BS 120-1/BS 120-2 on a non-sidelink carrier. In other embodiments, the UE 110-1/110-6 can be in-coverage with a serving cell associated with the BS 120-1/120-2 on a sidelink carrier. As the timing difference between the BSs 120-1 and 120-2 (if they are eNB and gNB, respectively) can be up to 500 μs, the timing offset can include at least one slot according to some embodiments. For example, the timing offset can include one slot and a number of symbols, that is, including a slot-level timing offset and a symbol-level timing offset.

At step 420, the UE 110-1/UE 110-6 can adjust its sidelink synchronization timing based on the timing offset. Therefore, the UEs 110-1 and 110-6 can be both synchronized to the GNSS, and communicate with each other.

At step 430, the UE 110-1/UE 110-6 can determine whether a sidelink transmission associated with the adjusted sidelink synchronization timing has a higher priority than an uplink transmission colliding with the sidelink transmission. The method 400 can proceed to step 440 when the sidelink transmission has a higher priority than the uplink transmission, or proceed to step 450 when the sidelink transmission does not have a higher priority than the uplink transmission. At step 440, the UE 110-1/UE 110-6 can prioritize the sidelink transmission over the uplink transmission and drop the uplink transmission. At step 450, the UE 110-1/UE 110-6 can prioritize the uplink transmission over the sidelink transmission and drop the sidelink transmission.

Figure 5:
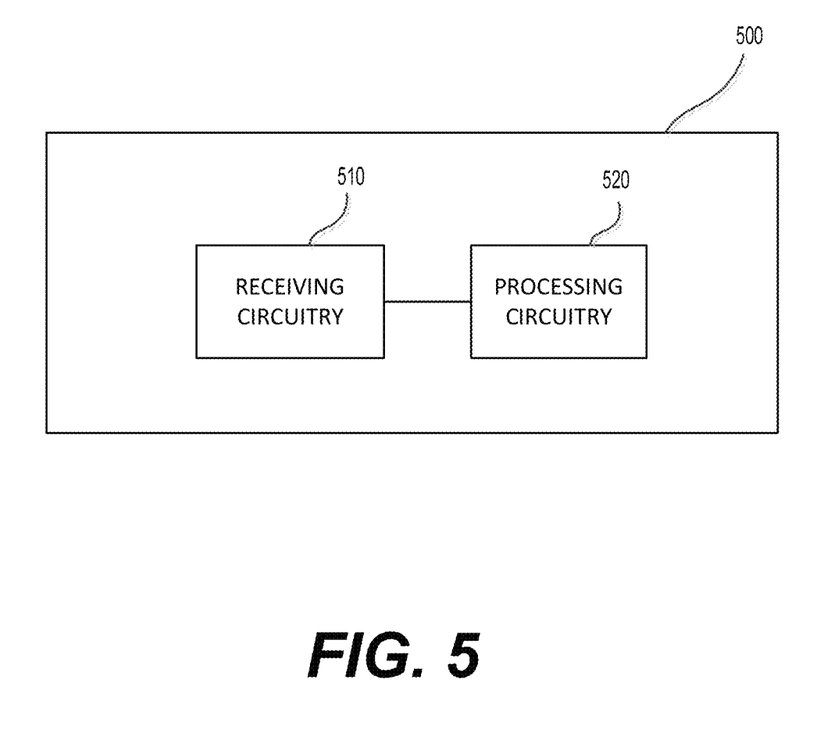
FIG. 5 shows a functional block diagram of an exemplary apparatus according to some embodiments of the disclosure.

FIG. 5 shows a functional block diagram of an exemplary apparatus 500 according to some embodiments of the disclosure. The apparatus 500 can be configured to perform various functions in accordance with one or more embodiments or examples described herein. Thus, the apparatus 500 can provide means for implementation of mechanisms, techniques, processes, functions, components or systems described herein. For example, the apparatus 500 can be used to implement functions of the UEs 110-1 to 110-9 in various embodiments and examples described herein. The apparatus 500 can include a general purpose processor or specifically designed circuits to implement various functions, components or processes described herein in various embodiments. In an embodiment, the apparatus 500 can include receiving circuitry 510 and processing circuitry 520.

In an embodiment, the receiving circuitry 510 can be configured to receive from a BS a signaling indicating a timing offset between sidelink synchronization timings of the apparatus 500 and a GNSS. For example, the signaling is an RRC signaling, a MAC-CE, or DCI.

In an embodiment, the processing circuitry 520 can be configured to adjust the sidelink synchronization timing of the apparatus 500 based on the timing offset. In some embodiments, the processing circuitry 520 can be further configured to prioritize a sidelink transmission associated with the adjusted sidelink synchronization timing over an uplink transmission colliding with the sidelink transmission when the sidelink transmission has a higher priority than the uplink transmission, and prioritize the uplink transmission over the sidelink transmission when the sidelink transmission does not have a higher priority than the uplink transmission.

In various embodiments according to the disclosure, the receiving circuitry 510 and the processing circuitry 520 can include circuitry configured to perform the functions and processes described herein in combination with software or without software. In various examples, the processing circuitry 520 can be a digital signal processor (DSP), an application specific integrated circuit (ASIC), programmable logic devices (PLDs), field programmable gate arrays (FPGAs), digitally enhanced circuits, or comparable device or a combination thereof. In some other embodiments according to the disclosure, the processing circuitry 520 can be a central processing unit (CPU) configured to execute program instructions to perform various functions and processes described herein.

The apparatus 500 can optionally include other components, such as input and output devices, additional or signal processing circuitry, and the like. Accordingly, the apparatus 500 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving a signaling from a base station (BS) at a user equipment (UE), the signaling indicating a timing offset between sidelink synchronization timings of the UE and a global navigation satellite system (GNSS);
adjusting the sidelink synchronization timing of the UE based on the timing offset;
prioritizing a sidelink transmission associated with the adjusted sidelink synchronization timing over an uplink transmission colliding with the sidelink transmission when the sidelink transmission has a higher priority than the uplink transmission; and
prioritizing the uplink transmission over the sidelink transmission when the sidelink transmission does not have a higher priority than the uplink transmission.

2. The method of claim 1, wherein the signaling is a radio resource control (RRC) signaling, a media access control-control element (MAC-CE), or downlink control information (DCI).

3. The method of claim 1, wherein the UE is out-of-coverage on a sidelink carrier, and in-coverage of a serving cell associated with the BS on a non-sidelink carrier.

4. The method of claim 1, wherein the UE is in-coverage with a serving cell associated with the BS on a sidelink carrier.

5. The method of claim 4, wherein the BS acts as a synchronization reference source for the UE.

6. The method of claim 1, wherein the timing offset includes at least one slot.

7. The method of claim 6, wherein the timing offset is indicated by a bitmap.

8. The method of claim 7, wherein the bitmap includes two bits.

9. An apparatus, comprising:
receiving circuitry configured for receiving from a BS a signaling indicating a timing offset between sidelink synchronization timings of the apparatus and a GNSS; and
processing circuitry configured for adjusting the sidelink synchronization timing of the apparatus based on the timing offset, prioritizing a sidelink transmission associated with the adjusted sidelink synchronization timing over an uplink transmission colliding with the sidelink transmission when the sidelink transmission has a higher priority than the uplink transmission, and prioritizing the uplink transmission over the sidelink transmission when the sidelink transmission does not have a higher priority than the uplink transmission.

10. The apparatus of claim 9, wherein the signaling is an RRC signaling, a MAC-CE, or DCI.

11. The apparatus of claim 9, wherein the apparatus is out-of-coverage on a sidelink carrier, and in-coverage of a serving cell associated with the BS on a non-sidelink carrier.

12. The apparatus of claim 9, wherein the apparatus is in-coverage with a serving cell associated with the BS on a sidelink carrier.

13. The apparatus of claim 12, wherein the BS acts as a synchronization reference source for the apparatus.

14. The apparatus of claim 9, wherein the timing offset includes at least one slot.

15. The apparatus of claim 14, wherein the timing offset is indicated by a bitmap.

16. The apparatus of claim 15, wherein the bitmap includes two bits.

\* \* \* \* \*